United States Patent [19]

Liu

[11] Patent Number: 5,520,474
[45] Date of Patent: May 28, 1996

[54] ADJUSTABLE COUPLING

[76] Inventor: Yang-Ting Liu, No. 76-1, 4 Lin, Shang-Kuan Li, Yuan Li Town, Miao Li Hsien, Taiwan

[21] Appl. No.: 324,463

[22] Filed: Sep. 19, 1994

[51] Int. Cl.⁶ .................................................. F16C 11/10
[52] U.S. Cl. ........................ 403/97; 403/103; 403/92; 403/84
[58] Field of Search .......................... 403/97, 101, 103, 403/93, 92, 95, 84, 104; 16/324, 325, 321, 349, 354, 258, 259, 279

[56] References Cited

U.S. PATENT DOCUMENTS

| | | | |
|---|---|---|---|
| 2,593,368 | 4/1952 | Verderber | 403/93 X |
| 5,018,405 | 5/1991 | Chiu | 16/349 X |
| 5,039,118 | 8/1991 | Huang | 403/97 X |
| 5,062,179 | 11/1991 | Huang | 403/93 X |
| 5,123,768 | 6/1992 | Franklin | 403/97 X |
| 5,358,352 | 10/1994 | Klarhorst | 403/104 |

FOREIGN PATENT DOCUMENTS 25356  3/1923  France ................................. 403/101

*Primary Examiner*—Anthony Knight

[57] ABSTRACT

An adjustable coupling including an axle, a fixed toggle mounted around the axle to hold a first frame rod, two movable toggles turned about the axle to hold a second frame rod and a third frame rod respectively, two locating plates mounted around the axle and prohibited from rotary motion relative to the axle and coupled with the movable toggles through a respective toothed joint, two cam holders fixed to the axle at two opposite ends, and two mushroom cam mounted around the axle and engaged with the cam holders, when the mushroom cams are fully received into the cam holders, the movable toggles can be disengaged from the locating plates and turned relative to the axle to adjust the angular positions of the second and third frame rods relative to the axle.

3 Claims, 4 Drawing Sheets

5,520,474

ADJUSTABLE COUPLING

BACKGROUND OF THE INVENTION

The present invention relates to couplings, and relates more particularly to an adjustable coupling for connecting a plurality of frame rods together permitting them to be adjustably retained at desired angular positions.

Adjustable couplings are intensively used in folding hand trucks and deck chairs to couple frame rods together permitting them to be adjusted relative to one another. The disadvantage of these adjustable couplings is that they allow the coupled frame rods to be turned between the operative and collapsed positions or adjusted at limited angles.

SUMMARY OF THE INVENTION

The present invention has been accomplished to provide an adjustable coupling which permits the coupled frame rods to be respectively adjusted through 360° angle. To achieve this object, there is provided an adjustable coupling comprised of an axle, a fixed toggle mounted around the axle to hold a first frame rod, two movable toggles turned about the axle to hold a second frame rod and a third frame rod respectively, two locating plates mounted around the axle and prohibited from rotary motion relative to the axle and coupled with the movable toggles through a respective toothed joint, two cam plate holders fixed to the axle at two opposite ends, and two cam plates mounted around the axle and engaged with the cam plate holders. When the cam plates are disengaged from the cam plate holders, the movable toggles can be disengaged from the locating plates and turned relative to the axle to adjust the angular positions of the second and third frame rods relative to the axle.

DETAILED DESCRIPTION OF THE PREFERRED EMBODIMENT

Figure 1:
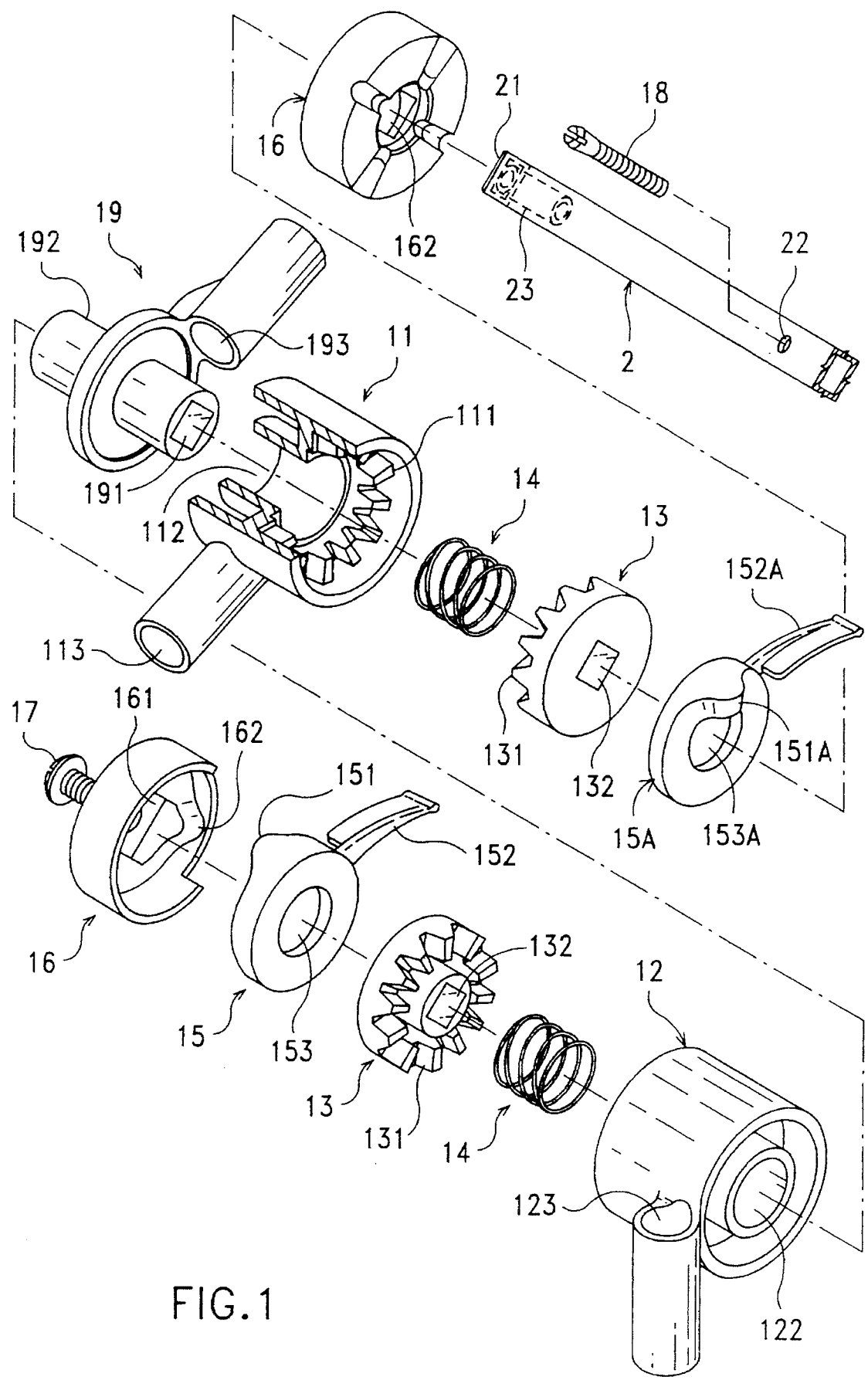
FIG. 1 is an exploded view of an adjustable coupling according to the present invention.

Referring to the annexed drawings in detail, an adjustable coupling in accordance with the present invention is generally comprised of a first movable toggle 11, a second movable toggle 12, two locating members 13, two coiled springs 14, a first mushroom cam 15, a second mushroom cam 15A, two cam holders 16, and a fixed toggle 19. These elements are respectively mounted around an axle 2 and stopped in place by a headed screw bolt 17 and a screw pin 18.

The axle 2 is polygonal bar having a first screw hole 23 axially at one end 21 thereof, and a second screw hole 22 spaced from the first screw hole 23 and disposed in a radial direction. The fixed toggle 19 comprises a circular shaft 192 having a polygonal bore 191, and an axle housing 193 perpendicularly spaced from the circular shaft 192 for receiving a first frame rod 41. The first movable toggle 11 comprises a circular axial hole 112, which receives one end of the circular shaft 192 of the fixed toggle 19, a crown gear 111 around the circular center through hole 112 at an outer end, and an axle housing 113 disposed in a radial direction for receiving a second frame rod 42. The second movable toggle 12 comprises a circular axial hole 122, which receives an opposite end of the circular shaft 192, a crown gear 121 (not shown) around the circular center through hole 122 at an outer end, and an axle housing 123 disposed in a radial direction for receiving a third frame rod 43. The locating members 13 are respectively coupled to the movable toggles 11 and 12, each having a crown gear 131 meshed with the crown gears 111 and 121 of the movable toggles 11 and 12 and a polygonal center through hole 132 fitting the axle 2. The coiled springs 14 are respectively mounted around the axle 2 and stopped between the locating members 13 and the movable toggles 11 and 12. The cam plate holders 16 are respectively mounted around the axle 2 at opposite ends, of the axle 2 each having a polygonal center through hole 161, which fits the axle 2, and a projecting portion 162 at an inner side. The first and second mushroom cams 15 and 15A are respectively rotated around the circular shaft 192 of the fixed toggle 19 and disposed between the locating members 13 and the cam holders 16 and received in the cam holders 16, each having a circular center through hole 153, which receive the circular shaft 192 of the fixed toggle 19, a projecting portion 151 respectively axially stopped against the projecting portions 162 of the cam holders 16, and a handle 152 respectively extended out of the cam holders 16. When all members are mounted around the axle 2, the headed screw bolt 17 and the screw pin 18 are respectively threaded into the first and second screw holes 23 and 22 on the axle 2 to stop all the members in place.

Figure 2:
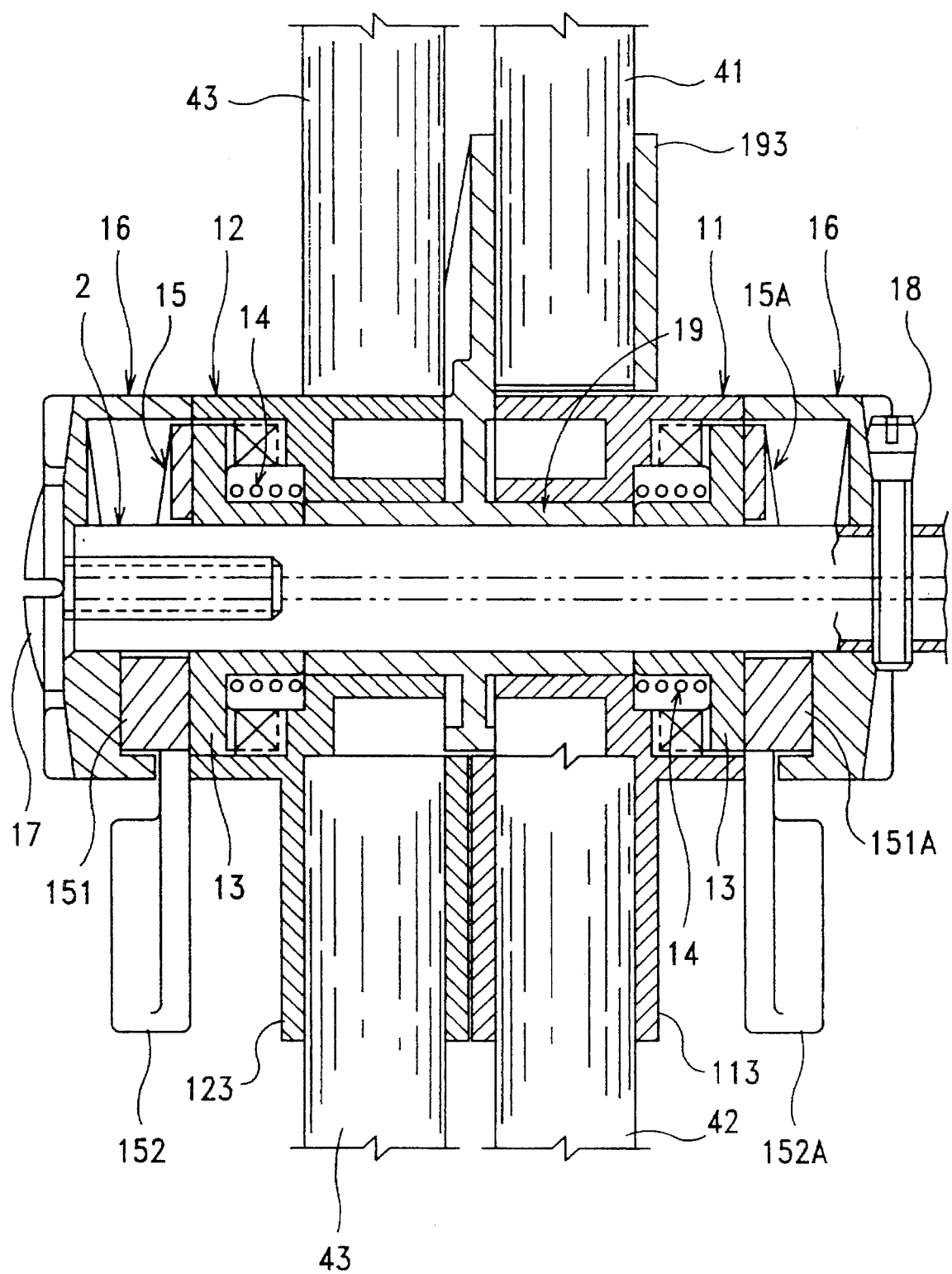
FIG. 2 is a longitudinal view in section of the adjustable coupling of FIG. 1 when installed.
Figure 3:
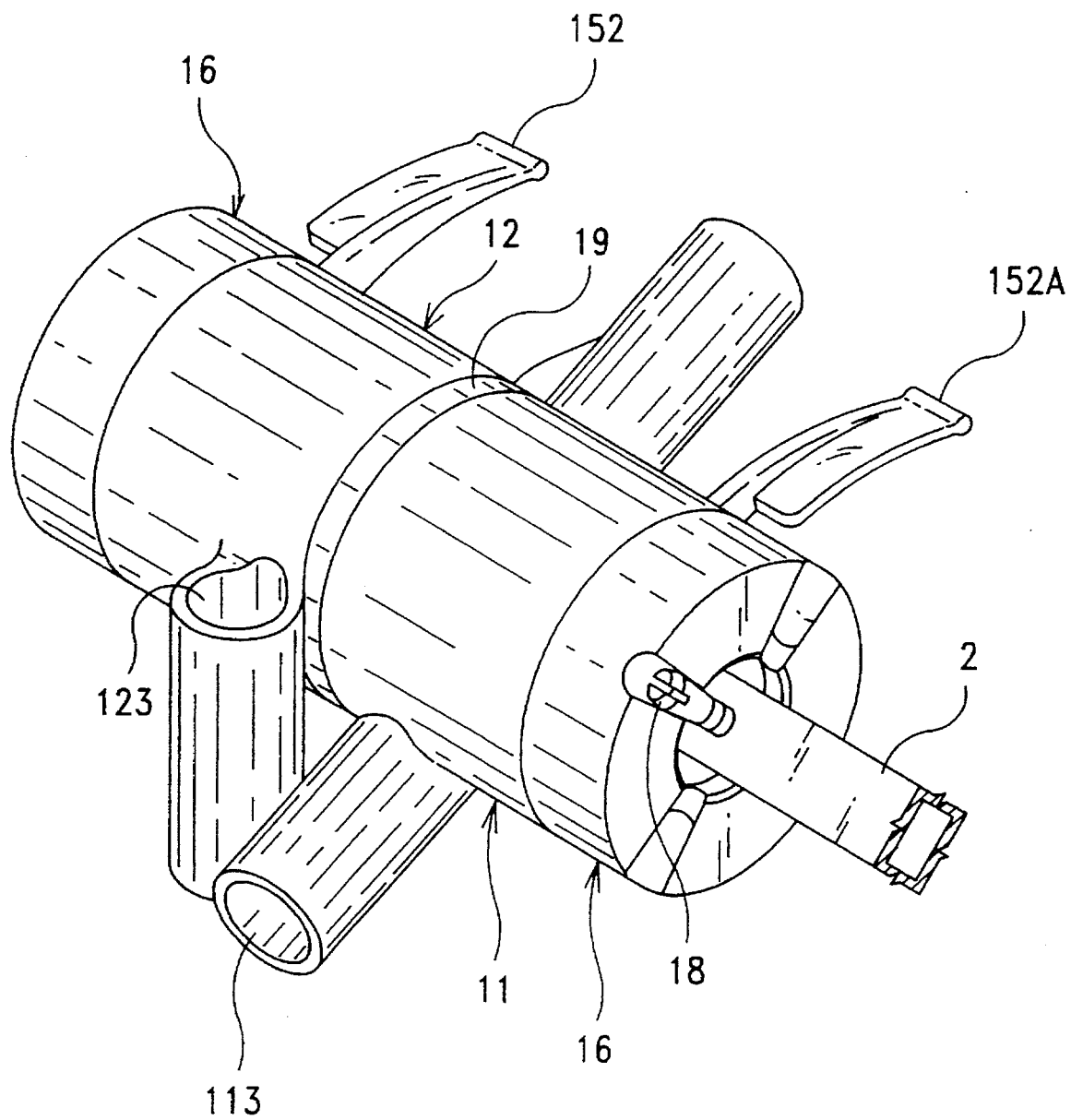
FIG. 3 is an elevational view of the adjustable coupling shown in FIG. 1.
Figure 4:
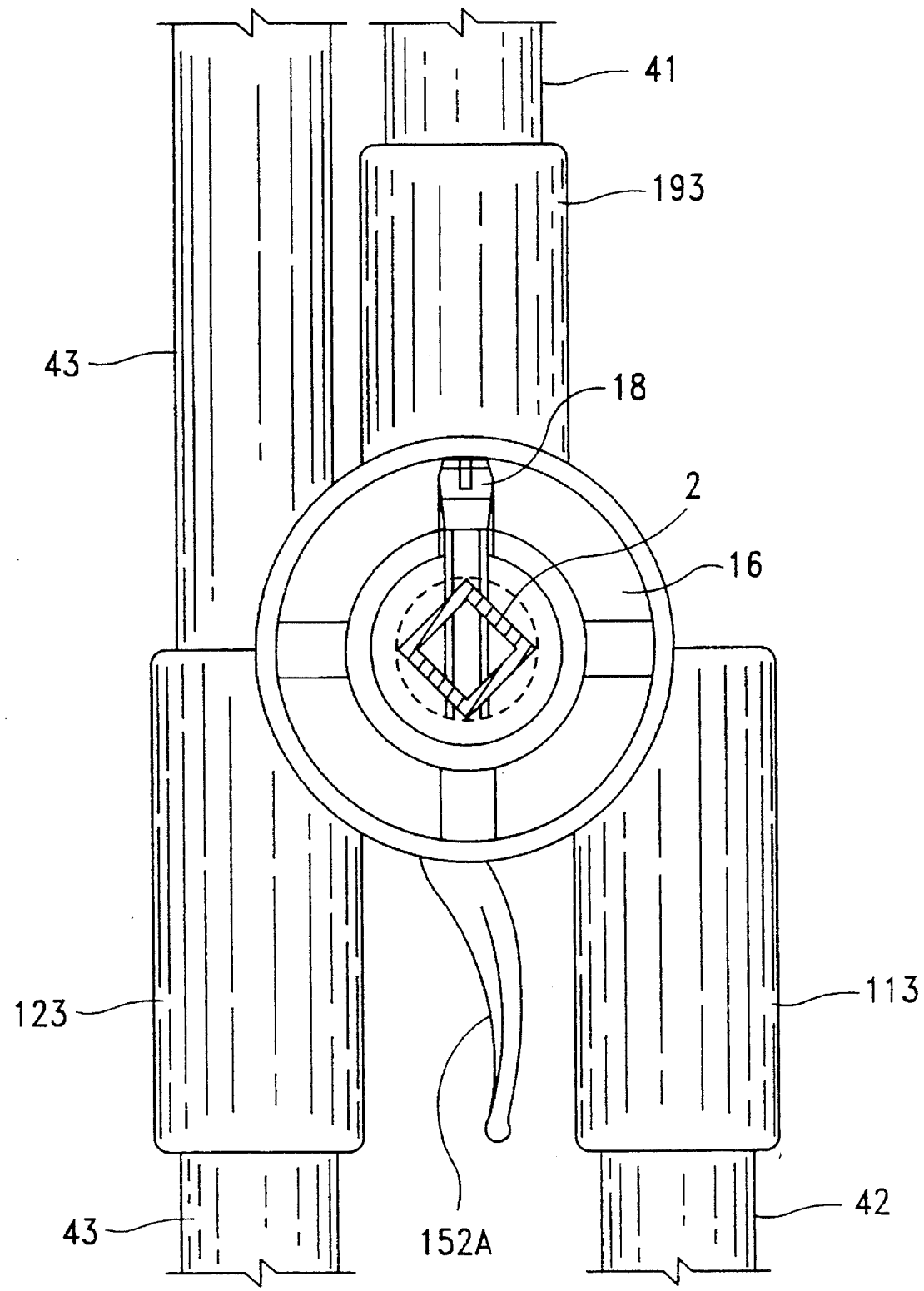
FIG. 4 is an end view in section of the adjustable coupling shown in FIG. 2.

Referring to FIGS. 2, 3, and 4 again, when the mushroom cams 15 and 15A are turned through the handles 152 and 152A to move the projecting portions 151 of the cam 15 and 15A sideways away from the projecting portions 162 of the cam holders 16, the coiled springs 14 are released from the pressure to push the crown gears 131 of the locating members 13 away from the crown gears 111 and 121 of the movable toggles 11 and 12, and therefore the movable toggles 11 and 12 can be rotated about the circular shaft 182 of the fixed toggle 19 to change the angular positions of the second and third frame rods 42 and 43 relative to the first frame rod 41. After the adjustment, the mushroom cam 15 and 15A are respectively turned back to let the projecting portions 151 of the mushroom cams 15 and 15A stop against the projecting portions 162 of the cam holders 16 axially, and therefore the locating members 13 are forced to engage with the crown gears 111 and 121 of the movable toggles 11 and 12 again.

What is claimed is:

1. An adjustable coupling comprising:

a polygonal axle;

a fixed toggle having a longitudinal shaft mounted around said polygonal axle and prohibited from rotary motion relative to said polygonal axle, and an axle housing perpendicularly connected to the longitudinal shaft of said fixed toggle for holding a frame rod;

a first movable toggle freely rotated about the longitudinal shaft of said fixed toggle at one end, having a crown gear at an outer end and an axle housing disposed in a radial direction relative to the longitudinal shaft of said fixed toggle for receiving a frame rod;

a second movable toggle freely rotated about the longitudinal shaft of said fixed toggle at an opposite end, having a crown gear at an outer end and an axle housing disposed in a radial direction relative to the longitudinal shaft of said fixed toggle for receiving a frame rod;

two locating members respectively mounted around said axle, each locating member positioned adjacent a respective movable toggle and prohibited from rotary motion relative to said axle, each locating member having a crown gear respectively;

two cam holders respectively fastened to said axle at opposite ends of said axle and prohibited from rotary motion relative to said axle, each cam holder having a projecting portion at an inner side;

two mushroom cams respectively freely rotated about said axle and received within said cam holders, each mushroom cam having a projecting portion respectively axially positioned between said projecting portions of said cam holders for forcing said crown gears of said locating members to mesh with said crown gears of said movable toggles;

spring means respectively mounted around said axle and stopped between said locating members and said movable toggles; and wherein said locating members can be disengaged from said movable toggles by turning said mushroom cam to move the projecting portions of said mushroom cam away from the projecting portions of said cam plate holders, for allowing said movable toggles to be freely rotated about the longitudinal shaft of said fixed toggle to change the angular positions of the axle housings of said movable toggles relative to said axle.

2. The adjustable coupling of claim 1 wherein said spring means are coiled springs.

3. The adjustable coupling of claim 1 wherein said mushroom cams have a respective handle extended out of said cam holders for turning by hand.

* * * * *